US009987829B2

(12) United States Patent
Announ et al.

(10) Patent No.: US 9,987,829 B2
(45) Date of Patent: Jun. 5, 2018

(54) METHOD FOR PRODUCING A CORE CARD, AND CORE CARD FOR A LAMINATE (71) Applicant: Mayr-Melnhof Karton AG, Vienna (AT)

(72) Inventors: Zakaria Announ, Erkrath (DE); Martin Muhlhauser, Frohnleiten (AT); Kurt Wannemacher, Grevenbroich (DE); Christian Neumann, Vienna (AT)

(73) Assignee: MAYR-MELNHOF KARTON AG, Wein (AT)

( * ) Notice: Subject to any disclaimer, the term of this patent is extended or adjusted under 35 U.S.C. 154(b) by 325 days.

(21) Appl. No.: 14/778,342

(22) PCT Filed: Mar. 27, 2014

(86) PCT No.: PCT/EP2014/056217
§ 371 (c)(1),
(2) Date: Sep. 18, 2015

(87) PCT Pub. No.: WO2014/154832
PCT Pub. Date: Oct. 2, 2014

(65) Prior Publication Data
US 2016/0059530 A1   Mar. 3, 2016

(30) Foreign Application Priority Data

Mar. 28, 2013   (WO) ................. PCT/EP2013/056760

(51) Int. Cl.
| | | |
|---|---|---|
| *B32B 37/10* | (2006.01) | |
| *B32B 29/00* | (2006.01) | |
| *D21H 27/30* | (2006.01) | |
| *D21C 5/02* | (2006.01) | |
| *D21F 11/04* | (2006.01) | |
| *D21F 11/08* | (2006.01) | |
| *D21H 11/00* | (2006.01) | |
| *D21H 11/04* | (2006.01) | |
| *D21H 11/14* | (2006.01) | |
| *D21H 15/02* | (2006.01) | |
| *D21H 23/04* | (2006.01) | |
| *B32B 37/08* | (2006.01) | |

(52) U.S. Cl.
CPC ............ *B32B 29/005* (2013.01); *B32B 37/08* (2013.01); *B32B 37/10* (2013.01); *D21C 5/02* (2013.01); *D21F 11/04* (2013.01); *D21F 11/08* (2013.01); *D21H 11/00* (2013.01); *D21H 11/04* (2013.01); *D21H 11/14* (2013.01); *D21H 15/02* (2013.01); *D21H 23/04* (2013.01); *D21H 27/30* (2013.01); *B32B 2250/26* (2013.01); *Y02W 30/648* (2015.05)

(58) Field of Classification Search
CPC ....... B32B 29/005; B32B 37/10; B32B 37/08; D21H 17/33
USPC ................................ 162/164.3, 164.6, 164.1
See application file for complete search history.

(56) References Cited

U.S. PATENT DOCUMENTS

2013/0068409 A1* 3/2013 Pingen ...................... B44C 5/04
162/164.3

FOREIGN PATENT DOCUMENTS

| CN | 1087560 A | 6/1994 |
|---|---|---|
| CN | 102947507 A | 2/2013 |
| DE | 10218265 C1 | 6/2003 |
| DE | 102006057861 A1 | 6/2008 |
| WO | 2007063182 A2 | 6/2007 |
| WO | 2009077001 A1 | 6/2009 |
| WO | 2011141355 A1 | 11/2011 |

OTHER PUBLICATIONS

"Solid waste treatment and utilization", Xie Zhifeng, p. 209, China radio and television university press, Jan. 31, 2014, published Jan. 31, 2014.
"Technology and evaluation method of reducing pollution and discharge during the whole process of pulping and papermaking industry", Sun Zhide et al, p. 48, China Environmental Science Press, Aug. 31, 2012, published Aug. 31, 2012.

* cited by examiner

*Primary Examiner* — Mark Halpern
(74) *Attorney, Agent, or Firm* — Barlow, Josephs & Holmes, Ltd.

(57) ABSTRACT

The invention relates to a method for producing a core card (20) with at least the steps of a) providing a reprocessed fibrous mixture having at least the following properties: the Brecht-Holl fine fraction is at most 50% by weight; the Brecht-Holl long fiber fraction is at least 10% by weight; the Brecht-Holl short fiber fraction is at most 60% by weight; and the ISO 1762 ash fraction is at most 20% by weight, b) preparing at least one fibrous suspension, c) processing the at least one fibrous suspension by carrying out at least one de-ashing of the fibrous suspension until the ash fraction of the dry component of the fibrous suspension is at most 15% by weight, and by adding at least one additive to the at least one fibrous suspension d) producing the laminar system from the at least one fibrous suspension.

27 Claims, 2 Drawing Sheets

Fig.1

METHOD FOR PRODUCING A CORE CARD, AND CORE CARD FOR A LAMINATE

This application is a 371 of PCT/EP2014/056217 filed 27 Mar. 2014.

BACKGROUND OF THE INVENTION

The invention relates to a method for producing a core card for a laminate, to a core card with a laminar system, to the use of such a core card for producing a laminate, to a laminate with such a core card as well as to an apparatus for producing such a core card.

Laminated laminates are usually composed of multiple plies of core card layers impregnated with resin, which are merged under high pressure. As web-shaped support materials, such laminates constitute the basis for worktops, window sills, linings, room claddings, partitions and many more. The core card layers are produced from individual plies of identical or different core cards, which can basically also be referred to as core papers or core paperboards according to grammage. Each core card in turn has a laminar system with one or more layers of fibrous materials. Depending on the respective purpose of employment of the laminated laminate, further layers or plies of other materials for satisfying certain characteristics can also be provided besides the layers or core cards. Furthermore, non-laminated laminates are also known, in which multiple layers or plies of core cards are pressed to each other without the aid of resins.

For a long time, core cards and papers were exclusively produced of fresh fiber materials to be able to satisfy the specific requirements to core cards with regard to tear strength, capability of impregnating, capability of further processing, optical impression and the like. In order to reduce the consumption of natural resources and the raw material cost associated with the use of fresh fiber material, in the meantime, some core cards are at least proportionally produced of recycled waste paper. Such a core card as well as a corresponding production method of such a core card can for example be taken from WO 2011/141355 A1. The core card described there is at least proportionally composed of a reprocessed fibrous mixture and includes in particular surface-active ingredients for increasing the capillarity of the core card as additives besides wet strength agents. The capillarity presents an important influencing variable for the capability of impregnating core cards with resins.

It has proven disadvantageous in the presently known core cards, which are at least proportionally produced of waste paper, that they have a comparatively high abrasiveness with respect to separating tools such as for example cutting, sawing and the like. This disadvantageously affects the idle times of the tools used for producing laminates since the corresponding grinding and cutting tools hereby have a shortened lifetime and have to be more often exchanged. A further disadvantage is in the use of surface-active ingredients, which present a load of the water circulation system on the paper machine, which can disturb the chemical equilibriums of the machine cycle of card machines, result in increase of the production cost and not least cause environmental and waste water loads.

BRIEF SUMMARY OF THE INVENTION

It is the object of the present invention to provide a method, which allows the production of a core card for a laminate, wherein the core card has a lower abrasiveness with respect to separating tools despite of the at least proportional use of a reprocessed fibrous mixture, a good air permeability as well as improved cost and environmental balance. A further object of the invention is in providing a core card, which is at least proportionally composed of a reprocessed fibrous mixture, has lower abrasiveness with respect to separating tools, a good air permeability and thus capability of impregnating as well as improved cost and environmental balance. Moreover, it is the object of the present invention to specify a use of such a core card for producing a laminated or non-laminated laminate, a corresponding laminate as well as an apparatus for producing a core card.

According to the invention, the objects are solved by a method of the present invention by a core card, by the use of such a core card, by a laminate as well as by an apparatus. Advantageous configurations of the invention are specified in detail below, wherein advantageous configurations of the method are to be regarded as advantageous configurations of the core card and vice versa.

A first aspect of the invention relates to a method allowing the production of a core card for a laminate, wherein the core card has a lower abrasiveness with respect to separating tools despite of at least proportional use of a reprocessed fibrous mixture, a good air permeability and thus capability of impregnating as well as an improved cost and environmental balance. Hereto, within the scope of the method according to the invention, at least the steps of a) providing a reprocessed fibrous mixture having at least the following characteristics:

the Brecht-Holl fine fraction is at most 50% by weight;
the Brecht-Holl long fiber fraction is at least 10% by weight;
the Brecht-Holl short fiber fraction is at most 60% by weight; and
the ISO 1762 ash fraction is at most 20% by weight, b) producing at least one fibrous suspension, which comprises at least a fraction of the fibrous mixture provided, c) processing the at least one fibrous suspension by carrying out at least one de-ashing of the fibrous suspension until an ash fraction of the dry component of the fibrous suspension is at most 15% by weight, and by adding at least one additive to the at least one fibrous suspension, the additive being selected from a group consisting of retention agents and wet strength agents, and d) producing the laminar system from the at least one fibrous suspension are performed. In other words, according to the invention, it is provided that for producing the core card, first, a reprocessed fibrous mixture with the above mentioned characteristics is provided, from which at least proportionally at least one fiber containing fibrous suspension is produced in the next step. Therein, the mentioned limit values of the provided fibrous mixture are determined by means of the standardized Brecht-Holl method, for example with the aid of a Brecht-Holl fractionator or according to the test instruction described in the Zellcheming leaflet VI/1/66. In particular, fine material fractions of 0% by wt., 1% by wt., 2% by wt., 3% by wt., 4% by wt., 5% by wt., 6% by wt., 7% by wt., 8% by wt., 9% by wt., 10% by wt., 11% by wt., 12% by wt., 13% by wt., 14% by wt., 15% by wt., 16, % by wt. 17% by wt., 18% by wt., 19% by wt., 20% by wt., 21% by wt., 22, % by wt., 23% by wt., 24% by wt., 25% by wt., 26% by wt., 27% by wt., 28% by wt., 29% by wt., 30% by wt., 31% by wt., 32% by wt., 33% by wt., 34% by wt., 35% by wt., 36% by wt., 37% by wt., 38% by wt., 39% by wt., 40% by wt., 41% by wt., 42% by wt., 43% by wt., 44% by wt., 45% by wt., 46% by wt., 47% by wt., 48% by wt., 49% by wt. or 50% by wt. as well as corresponding intermediate values such as 29.0% by wt., 29.1% by wt., 29.2% by wt., 29.3% by wt., 29.4% by wt., 29.5% by wt., 29.6% by wt., 29.7% by wt., 29.8% by wt., 29.9% by wt. etc. are to be understood by a fine material fraction of at most 50% by wt. By a long fiber fraction of at least 10% by wt., in particular long fiber fractions of 10% by wt., 11% by wt., 12% by wt., 13% by wt., 14% by wt., 15% by wt., 16% by wt., 17% by wt., 18% by wt., 19% by wt., 20% by wt., 21% by wt., 22, % by wt., 23% by wt., 24% by wt., 25% by wt., 26% by wt., 27% by wt., 28% by wt., 29% by wt., 30% by wt., 31% by wt., 32% by wt., 33% by wt., 34% by wt., 35% by wt., 36% by wt., 37% by wt., 38% by wt., 39% by wt., 40% by wt., 41% by wt., 42% by wt., 43% by wt., 44% by wt., 45% by wt., 46% by wt., 47% by wt., 48% by wt., 49% by wt., 50% by wt., 51% by wt., 52% by wt., 53% by wt., 54% by wt. 55% by wt., 56% by wt., 57% by wt., 58% by wt., 59% by wt., 60% by wt., 61% by wt., 62% by wt., 63% by wt., 64% by wt., 65% by wt., 66% by wt., 67% by wt., 68% by wt., 69% by wt., 70% by wt., 71% by wt., 72% by wt., 73% by wt., 74% by wt., 75% by wt., 76% by wt., 77% by wt., 78% by wt., 79% by wt., 80% by wt., 81% by wt., 82% by wt., 83% by wt., 84% by wt., 85% by wt., 86% by wt., 87% by wt., 88% by wt., 89% by wt., 90% by wt., 91% by wt., 92% by wt., 93% by wt., 94% by wt., 95% by wt., 96% by wt., 97% by wt., 98% by wt., 99% by wt. or 100% by wt., as well as corresponding intermediate values are to be understood. Therefore, a short fiber fraction of at most 60% by wt. accordingly denotes short fiber fractions of 0% by wt., 1% by wt., 2% by wt., 3% by wt., 4% by wt., 5% by wt., 6% by wt., 7% by wt., 8% by wt., 9% by wt., 10% by wt., 11% by wt., 12% by wt., 13% by wt., 14% by wt., 15% by wt., 16% by wt., 17% by wt., 18% by wt., 19% by wt., 20% by wt., 21% by wt., 22% by wt., 23% by wt., 24% by wt., 25% by wt., 26% by wt., 27% by wt., 28% by wt., 29% by wt., 30% by wt., 31% by wt., 32% by wt., 33% by wt., 34% by wt., 35% by wt., 36% by wt., 37% by wt., 38% by wt., 39% by wt., 40% by wt., 41% by wt., 42% by wt., 43% by wt., 44% by wt., 45% by wt., 46% by wt., 47% by wt., 48% by wt., 49% by wt., 50% by wt., 51% by wt., 52% by wt., 53% by wt., 54% by wt., 55% by wt., 56% by wt., 57% by wt., 58% by wt., 59% by wt. or 60% by wt. as well as corresponding intermediate values. It is understood that the weight fractions of all of the components of a material always and exclusively complement each other to 100%. Therein, the present invention is based on the realization that in use of waste paper for producing core cards, correspondingly large amounts of printing colors, attached contaminants, fine materials and ash components are introduced into the fibrous suspension(s) used for producing the core card. The ash components, which can also be referred to as residues on ignition, include inorganic compounds such as for example calcium carbonate, which is employed in the surface finishing of papers and cards as a coating component during the paper production. Further ash components can be fillers and pigments such as for example talcum, titanium dioxide, aluminum hydroxide, alumina, bentonite, barium sulfate, gypsum, kaolins and the like, which are also often used in the paper and card production. Primarily, cellulose containing fibrous materials and fibrous residues are referred to as fine materials, which have a shorter fiber length than so-called short fibers according to the definition according to Brecht-Holl.

As the applicant has recognized, primarily, the ash fraction is responsible for the abrasiveness of the finished core card with respect to usual processing tools and causes severely shortened lifetimes as well as high idle times of the used separating tools. Furthermore, the applicant has ascertained that the influence of ash—and also of fine materials to lower extent—on the capability of impregnating and air permeability of the finished core card with resins is very negative since they build up in the interstices between the fibers, the so-called capillaries, due to their low size and clog them. Thereby, in the subsequent production of a laminated laminate, the resin impregnation or the filling of the present capillaries of the core card with resin or similar substances and thereby the quality of the laminated laminate are severely deteriorated. By resins and similar substances, within the scope of the present invention, polymers and base materials for organic plastics are generally understood. Resins and resin-like substances therefore usually have solid to liquid organic materials at room temperature and additionally include sticky and non-crystalline materials, which are soluble in the usual organic solvents, but poorly or non-soluble in water. Basically, the resins and resin-like substances can include naturally occurring and/or synthetic materials and usually appear yellowish to brownish or clear to turbid. The production and capability of further processing of non-laminated laminates is also adversely affected by ash and fine materials in the core card. By the specific selection of waste paper with the above mentioned characteristics, it is advantageously ensured that the fibrous suspension produced in step b), which basically can be partially or completely composed of the waste paper selected in step a) with respect to its fiber content, contains an ash fraction as low as possible from the outset and moreover a sufficiently high fraction of long fibers, which advantageously contribute to good porosity, air permeability and thus capability of impregnating of the core card. If the fibrous suspension is only proportionally produced from the provided waste paper with respect to its fibrous fraction, preferably fresh fibers are used as a further fibrous component. However, within the scope of the invention, it can be readily provided that the fibrous fraction of the fibrous suspension is exclusively composed of the provided waste paper since due to the specific selection of the waste paper, the various advantages of the invention can also be realized with a waste paper fraction of 100%. In step c), the fibrous suspension is processed to the effect that by cleaning or de-ashing the fibrous suspension, the ash fraction of the dry component is adjusted to a value of at most 15% by wt. on the one hand and that at least one additive from the group of the retention agents and wet strength agents is added to the fibrous suspension on the other hand. It is understood that the cleaning or de-ashing step can basically be omitted if the ash fraction of the fibrous suspension is already below the respectively requested limit value from the outset due to the use of particularly low-ash or even ash-free raw materials and cleaning of the fibrous suspension extending beyond does not seem to be required. The addition of a retention agent allows control of dewatering of the fibrous suspension in laminating, while the addition of a wet strength agent advantageously increases the wet tear strength of the formed layer. In this context, it is pointed out that percentage indications within the scope of the present invention basically are to be regarded as percent by weight unless anything to the contrary is indicated. Therein, the cleaning or de-ashing of the fibrous suspension basically can include one or more optionally different purification steps. The addition of the at least one additive basically can be performed once or multiple times before, during or after cleaning or de-ashing, wherein addition after completion of the de-ashing is preferred to reliably avoid unnecessary losses of additive and possible disruptions of the purification. Due to the specifically selected waste paper and the controlled de-ashing of the fibrous suspension, in contrast to the prior art, the addition of surface-active additives can be advantageously omitted without having to accept losses with respect to air permeability, capability of impregnating and wet tear strength of the core card. This allows realization of considerable cost savings and significantly improves the environmental balance of the core card produced according to the invention together with the use of recycled waste paper. Besides the mentioned additives from the group of retention agents and wet strength agents, however, further additives can basically be used to equip the fibrous suspension or the core card and/or a laminate produced from the core card with desirable characteristics. Basically, a core card can be produced, which is exclusively composed of the one- or multi-layer laminar system. Alternatively, in addition to the laminar system, further elements, for example plastic foils, metal foils or the like, can be connected to the laminar system. Furthermore, it can be basically provided that a laminar system is produced, which is only composed of a single layer. Alternatively, a laminar system of multiple layers can be produced. The production of the laminar system can for example be effected by means of a card machine.

For particularly simply complying with the characteristics requested in step a), it has proven advantageous if waste paper, in particular kraft containing waste paper sorts of the main group 4 and/or OCC waste paper, are used as the reprocessed fibrous mixture. Therein, the specification "kraft containing waste paper sort of the main group 4" relates to the CEPI list of the European standard sorts for waste paper and includes:

new chips of corrugated paperboard: new chips of corrugated paperboard with covers of kraft or test liners;
unused kraft corrugated paperboard: unused packagings, sheets and chips of corrugated paperboard, exclusively with kraft liners. Corrugation of cellulose or semi-cellulose
unused corrugated paperboard: unused packagings, sheets and chips of corrugated paperboard with covers of kraft or test liners;
used kraft corrugated paperboard 1: used packagings of corrugated paperboard, covers exclusively with kraft liners, corrugation of cellulose or semi-cellulose;
used kraft corrugated paperboard 2: used packagings of corrugated paperboard with covers of kraft liners or test liners, however, wherein at least one cover is produced of kraft liners;
used kraft paper bags: clean, used kraft paper bags, wet strength and not wet strength;
used kraft paper bags with plastic-coated papers, clean, used kraft paper bags, with wet strength and not wet strength, plastic-coated papers are allowed;
unused kraft paper bags: unused kraft paper bags, with wet strength or not wet strength;
unused kraft paper bags with plastic-coated papers: unused kraft paper bags, with wet strength or not wet strength, plastic-coated papers are allowed;
used kraft paper: kraft paper and paperboard, used, natural colored or bright.
unused kraft paper: chips and other kraft papers and paperboards, unused, natural colored; and
unused kraft support card: unused kraft support card, wet-strength paper allowed.

Hereby, the specifications with regard to fine fraction, long fiber fraction, short fiber fraction and ash fraction can be comparatively easily adjusted. So-called "old corrugated containers", that is used corrugated paperboards, corrugated containers, box solid boards etc. are understood by OCC waste paper, which preferably come from America (American old corrugated containers, AOCC). Among other things, AOCC have the advantage that they usually inherently have a relatively low ash fraction such that the purification of the fibrous mixture in this respect is correspondingly simplified or can even be completely avoided.

In an advantageous configuration of the invention, a laminar system is produced, which has an ash fraction of at most 15% by wt., in particular of at most 8% by wt. and preferably of at most 4% by wt. and/or which contains a fraction of at least 80%, preferably of at least 95% of the provided reprocessed fibrous mixture. In particular, ash fractions of 15.0% by wt., 14.5% by wt., 14.0% by wt., 13.5% by wt., 13.0% by wt., 12.5% by wt., 12.0% by wt., 11.5% by wt., 11.0% by wt., 10.5% by wt., 10.0% by wt., 9.5% by wt., 9.0% by wt. 8.5% by wt., 8.0% by wt., 7.5% % by wt., 7.0% by wt., 6.5% by wt., 6.0% by wt., 5.5% by wt., 5.0% by wt., 4.5% by wt., 4.0% by wt., 3.5% by wt., 3.0% by wt., 2.5% by wt., 2.0% by wt., 1.5% by wt., 1.0% by wt., 0.5% by wt. or 0% by wt. as well as corresponding intermediate values such as for example 5.0% by wt., 4.9% by wt., 4.8% by wt., 4.7% by wt., 4.6% by wt., 4.5% by wt., 4.4% by wt., 4.3% by wt., 4.2% by wt., 4.1% by wt., 4.0% by wt. etc. are to be understood by an ash fraction of at most 15% by wt. Hereby, a core card can be produced, which has a particularly low abrasiveness with respect to separating tools and additionally satisfies particularly high quality demands with respect to air permeability and capability of impregnating. Therein, it can basically be provided that all layers of the laminar system are produced with an ash fraction below 15% by wt. or that some layers have a higher ash fraction and other layers have a correspondingly lower ash fraction as long as it is ensured that the entire laminar system has an ash fraction of at most 15% by wt.

Alternatively or additionally, it can be provided that the fibrous suspension with respect to its solid content is at least 80% by wt. composed of the reprocessed fibrous mixture, for example of waste paper. In particular, fractions of 80%, 81%, 82%, 83%, 84%, 85%, 86%, 87%, 88%, 89%, 90%, 91%, 92%, 93%, 94%, 95%, 96%, 97%, 98%, 99% or 100% as well as corresponding intermediate values such as for example 95.0%, 95.1%, 95.2%, 95.3%, 95.4%, 95.5%, 95.6%, 95.7%, 95.8%, 95.9% or 96.0% are to be understood by a fibrous mixture fraction of at least 80%. In other words, it is provided that the fiber fraction of the fibrous suspension—except for additives—is at least 80% or completely composed of the reprocessed fibrous mixture. Hereby, a particularly good environmental balance as well as considerable savings is achieved by the omission of fresh fibers.

In a further advantageous configuration of the invention, it is provided that fresh fibers, in particular cellulose, are admixed with at least one fibrous suspension before producing the laminar system, wherein the fraction of the fresh fibers on the overall fibers of the fibrous suspension is preferably at most 20% by wt. By admixing fresh fibers, basically, layers with higher air permeability values can be produced. Preferably, the fresh fibers of the fibrous suspension are admixed with a weight fraction related to the fiber fraction of the fibrous suspension of 1.0% by wt., 1.5% by wt., 2.0% by wt., 2.5% by wt., 3.0% by wt., 3.5% by wt., 4.0% by wt., 4.5% by wt., 5.0% by wt., 5.5% by wt., 6.0% by wt., 6.5% by wt. 7.0% by wt., 7.5% by wt., 8.0% by wt., 8.5% by wt., 9.0% by wt., 9.5% by wt., 10.0% by wt., 10.5% by wt., 11.0% by wt., 11.5% by wt., 12.0% by wt., 12.5% by wt., 13.0 % by wt., 13.5% by wt., 14.0% by wt., 14.5% by wt., 15.0% by wt., 15.5% by wt., 16.0% by wt., 16.5% by wt., 17.0% by wt., 17.5% by wt., 18.0% by wt., 18.5 % by wt., 19.0% by wt., 19.5% by wt. or 20.0% by wt. Therein, the admixing can basically be effected once or multiple times at any method time before the production of the laminar system. Preferably, the admixing is effected immediately before production of the laminar system to avoid fresh fiber losses, undesired shortenings of the fresh fibers and the like during the processing of the fibrous suspension.

Further advantages arise if a sorter and/or a preferably multi-stage cleaner system and/or a disperser and/or a flotation device and/or a variosplit device are used for processing the fibrous suspension. Hereby, a particularly reliable cleaning and de-ashing of the waste paper containing fibrous suspension can be achieved with at the same time particularly gentle treatment of the long fiber fraction. Therein, any combinations of the specified processing devices can basically be used. Hereby, particularities of the selected waste paper can be particularly well taken into account on the one hand, on the other hand, in this manner, fibrous suspensions can be differently processed to be able to produce a laminar system with different layers. A sorter can for example be used as a centrifugally operating coarse dirt sorter, which is composed of a stationary sorting basket and a rotor, which generates positive pressure and negative pressure by its movement, whereby foreign substances like plastic, glass and metal are discharged from the fibrous suspension as a reject and the sorting basket surfaces are kept free. With the aid of a cleaner system, heavier and abrasive particles with a higher specific weight than cellulose fiber, for example sand, glass and ash components, can be separated from the fibrous suspension. Hereto, the fibrous suspension is pressed against a conical wall of the cleaner system with high water dilution (for example 2% material density) by means of centrifugal acceleration and discharged at the lower end of the cleaner system as a reject via gravity. This separating method can preferably be performed in 3 or 4 stages to achieve a correspondingly high cleaning degree. Alternatively or additionally, dispersers or dispersing sets can be used, which allow homogenization of the fibrous suspension and disintegration of possible contaminants below the visibility limit.

Therein, the larger the distance of the toothed rims and the teeth on the disperser set to each other and the larger the gap between the disperser disks, the more gently the material dispersion can be effected such that the homogenization of the fibrous suspension can be at least largely performed without or without considerable shortening of the fibers. With a flotation device, fine materials, ash, printing colors and the like are floated to the surface by agglomerations on air bubbles and can be discharged from the fibrous suspension. With a variosplit device, the fibrous suspension is injected between a rotating roller and a rotating screen. Therein, the rotating screen presses the fibrous suspension against the rotating roller. Therein, much water is discharged from the fibrous suspension, wherein ash and fine materials are also discharged with the water at the same time. A variosplit device can therefore be used for concentrating the fibrous suspension at the same time. Preferably, at least one coarse dirt sorting in particular with the aid of a sorter as well as a fine dirt sorting in particular by means of a preferably multi-stage cleaner system are performed for de-ashing the fibrous suspension.

By concentrating at least one fibrous suspension before producing the laminar system, precise adjustment of the fiber and solid content is allowed. Moreover, the concentration allows simpler handling and intermediate storage of the fibrous suspension, for example in a stock vat. Furthermore, the layer formation on the card machine can be particularly precisely effected by a concentrating step. Moreover, various time and cost advantages arise because the required drying distances and times can be correspondingly shortened.

Further advantages arise if at least a part of at least one fibrous suspension is fractioned in a long fiber fraction and a short fiber fraction before producing the laminar system. In other words, it is provided that double fractioning, that is separation of short and long fibers, is performed within the scope of processing the fibrous suspension. Therein, only a part of the fibrous suspension or the entire fibrous suspension can basically be fractioned. With sorting methods known from the prior art, long fibers are normally recognized as reject and sorted out. The particularity of the present method step is in that the long fibers are recovered from the reject of the fractionators and not discharged from the material system. For example, this can be effected by a particularly high dilution, adaptation of the rotor speeds of a sorter and by the adaptation of the differential pressures between inlet and outlet of a fractionator. As already mentioned, the long fibers are of great importance for the porosity, air permeability and capability of impregnating of the core card within the scope of the method according to the invention. By separating short and long fibers, the possibility is provided to particularly precisely adjust the fraction of short and long fibers in the fibrous suspension such that the laminar system can be produced with correspondingly particularly precise characteristics. Basically, it applies that the porosity, air permeability and capability of impregnating of a layer are the higher, the larger the fiber length of the fibrous material and the higher the long fiber fraction in the overall fibrous material are.

Therein, in further configuration of the invention, it is provided that the long fiber fraction and/or the short fiber fraction are supplied with water vapor and/or homogenized and/or dispersed. By supplying with water vapor, the fibers become smooth and more resistant to break, whereby undesired damages and fiber shortening are advantageously prevented. By homogenizing and/or dispersing the fibers, the quality of the layer produced in the following can be further improved and its characteristics can be particularly precisely adjusted in particular with regard to its porosity and air permeability. The homogenization and dispersion, respectively, can for example be effected by means of a disperser, wherein the supply with water vapor is preferably effected before entry of the fibrous suspension into the disperser.

Further advantages arise if the long fiber fraction and the short fiber fraction are mixed with the fibrous suspension in a predetermined ratio after fractionating. Therein, it can basically be provided that the fibrous suspension is reconstituted by specifically mixing long and short fibers or that the long and short fibers are admixed with the fibrous suspension in the predetermined ratio. Hereby too, the laminar system can be produced with correspondingly particularly precise characteristics.

A further possibility for particularly precise adjustment of the specific characteristics of the laminar system or of the core card is provided according to the invention in that the laminar system is produced with at least two and preferably with at least three layers. For example, the laminar system can be produced with 2, 3, 4, 5, 6, 7, 8, 9, 10, 11, 12, 13, 14, 15, 16, 17, 18, 19, 20 or more layers, wherein at least three layers or at most four layers are particularly preferred for many fields of application. Therein, the number of the layers producible at the same time is usually determined by the respectively used card machine, paper machine, corrugated paperboard machine or the like, which for example has to have a corresponding number of Fourdrinier wires, hybrid formers, top wire drainages and the like.

Therein, it has further proven advantageous if at least two differently produced and/or differently processed fibrous suspensions are used for producing the laminar system. By the presence of multiple layers, different raw material recipes per layer are possible. Furthermore, a different dissolution of the raw material composition over multiple pulpers is possible. Finally, according to layer or ply, specific processing of the fibrous suspension can be performed. Hereby, the laminar system can be formed optimally adapted to its respective purpose of employment.

In further configuration of the invention, a particularly good capability of impregnating the core card is achieved in that at least one outer layer of the laminar system is produced more porous than an underlying inner layer of the laminar system and/or that at least one inner layer of the laminar system is produced more porous than a layer of the laminar system located farther outside and/or that all of the layers of the laminar system are produced with an at least substantially identical porosity. In particular with a laminar system of three or more layers, it can be provided that the two outer layers are produced more porous than the inner layer(s). In this manner, the resin and/or the resin-like substance used in impregnating can particularly fast penetrate the entire laminar system and completely wet the laminar system. Alternatively, the outer layers can also be produced less porous than the inner layer(s). Similarly, it can be provided that all of the layers at least substantially have the same porosity, wherein the porosity can be adjusted to higher or lower values according to purpose of application of the core card.

Further advantages arise if a laminar system is produced, in which at least one layer of the laminar system has a degree of grinding of at most 25°SR (Degree Schopper-Riegler according to DIN EN ISO 5267-1), in particular a degree of grinding between 20°SR and 8°SR, and/or in which at least one layer of the laminar system has a degree of grinding of at least 8°SR, in particular a degree of grinding between 15°SR and 60°SR. In particular, it can be provided that at least one layer has a degree of grinding of 25°SR, 24°SR, 23°SR, 22°SR, 21°SR, 20°SR, 19°SR, 18°SR, 17°SR, 16°SR, 15°SR, 14°SR, 13°SR, 12°SR, 11°SR, 10°SR, 9°SR, 8°SR, 7°SR, 6°SR, 5°SR, 4°SR, 3°SR, 2°SR or 1°SR and/or that at least one layer has a degree of grinding of 8°SR, 9°SR, 10°SR, 11°SR, 12°SR, 13°SR, 14°SR, 15°SR, 16°SR, 17°SR, 18°SR, 19°SR, 20°SR, 21°SR, 22°SR, 23°SR, 24°SR, 25°SR, 26°SR, 27°SR, 28°SR, 29°SR, 30°SR, 31°SR, 32°SR, 33°SR, 34°SR, 35°SR, 36°SR, 37°SR, 38°SR, 39°SR, 40°SR, 41°SR, 42°SR, 43°SR, 44°SR, 45°SR, 46°SR, 47°SR, 48°SR, 49°SR, 50°SR, 51°SR, 52°SR, 53°SR, 54°SR, 55°SR, 56°SR, 57°SR, 58°SR, 59°SR or 60°SR. The lower the degree of grinding of the processed fibrous suspension in the sheet formation on the card machine, the higher the air permeability and thereby the capability of impregnating of the finished core card. The characteristic of porosity is utilized in the configuration of the individual layers of the laminar system. In contrast, higher degrees of grinding of the concerned layer(s) result in higher mechanical stability and strength of the laminar system.

Further advantages arise if the additive of the fibrous suspension related to the dry matter is added in a weight fraction of at most 5.0% and/or that the additive includes a retention agent, which is added to the suspension in a weight fraction of at most 1.2%, in particular between 0.2% and 0.9%, related to the dry matter and/or that the additive includes a wet strength agent, which is added to the suspension related to the dry matter in a weight fraction of at most 2.2%, in particular between 0.5% and 2.0%. Therein, by a weight fraction of at most 5.0%, in particular weight fractions of 5.0%, 4.9%, 4.8%, 4.7%, 4.6%, 4.5%, 4.4%, 4.3%, 4.2%, 4.1%, 4.0%, 3.9%, 3.8%, 3.7%, 3.6%, 3.5%, 3.4%, 3.3%, 3.2%, 3.1%, 3.0%, 2.9%, 2.8%, 2.7%, 2.6%, 2.5%, 2.4%, 2.3%, 2.2%, 2.1%, 2.0%, 1.9%, 1.8%, 1.7%, 1.6%, 1.5%, 1.4%, 1.3%, 1.2%, 1.1%, 1.0%, 0.9%, 0.8%, 0.7%, 0.6%, 0.5%, 0.4%, 0.3%, 0.2%, 0.1% or less are to be understood. Retention agents basically serve for controlling the drainage in the sheet or layer formation on the card machine. Basically, weight fractions of 0.3% to 0.8% of retention agent have proven particularly advantageous. The employment of wet strength agents in particular ensures non-disruptive impregnation of the finished core card with impregnating resin in a subsequent production of a laminate. Depending on the characteristics of the fibrous suspension of the desired layer characteristics, weight fractions of wet strength agent of up to 2.0% have proven particularly advantageous.

In a further advantageous configuration of the invention, it is provided that at least one retention agent of the group of polyacrylamides, polyethylenimines and polyamidimines and/or at least one wet strength agent from the group of polyamidoamine epichlorhydrin resins, epoxy resins, polyamine resins, isocyanate resins, melamine formaldehyde resins, urea formaldehyde resins, formaldehyde resins, dialdehyde starch, glyoxal, glutaraldehyde and/or a copolymer of at least two of the listed substances is used as the additive. A combination of polyethylenimine as the retention agent and polyamidoamine epichlorhydrin as the wet strength agent is particularly preferred.

Further advantages arise if additionally at least one acid and/or at least one base and/or $CO_2$ are used as the additive. By the addition of an acid and/or a base, the pH value of the aqueous system can be specifically adjusted and optionally buffered. The same applies to the addition of $CO_2$, which can react to carbonic acid or to carbonates in the aqueous systems. For example, with the aid of a pure carbonate buffer, that is by a mixture of carbonic acid and hydrogen carbonate(s), the pH value of the aqueous system can be buffered in the pH range between about 7.35 and about 7.45. However, other buffer systems with varying pH values can basically also be provided. For example, by a carbonic acid bicarbonate buffer, a pH value between about 6.2 and about 8.6 can be adjusted and buffered. An acetic acid acetate buffer can be used for buffering in the pH range between about 3.7 and about 5.7. Depending on the respective application, of course, the use of buffer systems is also conceivable, which buffer in the alkaline pH range above pH 7. The shift of the pH value to higher values can for example be effected by addition of caustic soda lye or the like. Besides adjustment or buffering of the pH value, by addition of an acid, a base and/or $CO_2$, advantageous adjustment of the water hardness of the water system and/or the ash content and/or the filler content of the subsequent core card can also be performed. In particular by addition of $CO_2$ and/or by addition of hydrogen carbonates or carbonates, depending on the pH value, certain fillers or ash components can be dissolved and/or precipitated as carbonates, whereby particularly simple ash control of the fibrous suspension is allowed. Alternatively or additionally, precipitation of ash components as sulfates, phosphates, chlorides etc. of course is also possible by for example adding sulfuric acid, phosphoric acid, hydrochloric acid or the like individually or in any combination.

In a further advantageous configuration of the invention, it is provided that process water of the card machine arising in the production of the laminar system is cleaned, in particular de-ashed by means of a micro flotation device, and/or is used for producing at least one fibrous suspension. Due to the continuous introduction of ash and fine materials via the used waste paper, the white water circuits of the card machine also continuously augment during the production of the core card. Therefore, a continuous separation of ash and of fine materials during the production of the core card is advantageous to satisfy the quality demands with respect to air permeability, capability of impregnating and abrasiveness. For example, this can be effected with the aid of a micro flotation device (pressure relief flotation). Therein, the cleaning effect of the micro flotation device can advantageously be adjusted via the size of the air bubbles and the volume-related air content to the average diameters of the particles to be removed. By again recycling the purified process water and using it for producing the fibrous suspension, further environmental and cost advantages arise due to saving fresh water.

Further advantages arise in that at least one parameter of the group of grammage, moisture content, density, dry breaking length, wet breaking length, air permeability, ash fraction, capability of impregnating and porosity of the produced core card is determined. Hereby, quality control of the produced laminar system or core card is advantageously allowed. If deviations from a set value are ascertained at a determined parameter, it can be provided that a process parameter effectively associated to the concerned parameter is correspondingly varied.

Therein, it has proven advantageous if the capability of impregnating the core card is determined with the aid of ultrasonic measurement. This presents a simple, inexpensive and fast possibility of assessing the resin absorbing capacity of the core card.

In a further advantageous configuration of the invention, it is provided that at least one core card is used for producing a laminate, in particular an HPL laminate and/or a CPL laminate and/or a compact plate and/or as a support material in particular for resins or resin-like substances. An HPL laminate (high-pressure laminate) is a laminated laminate in plate shape produced in the high-pressure pressing method, which is produced of multiple plies of the core card. A CPL laminate (continuous pressure laminate) is a laminated laminate produced of multiple plies of core card in the continuous process. It can be produced in plate shape or as rolled goods and for example be used for coating surfaces. Compact plates are composed of correspondingly many plies of the core card according to desired thickness. They are in particular suited for cladding purposes. Further basically possible types of configuration and use for laminates and compact plates exemplarily include facades and rear-ventilated facade systems such as balconies, handrail claddings, railings, bounds, visual covers and windbreaks, canopies, business portals and cabin construction, indoor applications such as for example walls, partitions, ceilings, doors, floor covers, stairs, furniture, chairs, tables, rails, window sills, worktops, counters, washstands and wet room elements as well as outdoor applications such as for example balconies, facades, partial facades, reveals, outdoor furniture or signs. However, the core card produced according to the invention can basically also be used for producing further laminates, for example for overlays, decorative papers, decorative cards, decorative paperboards, foils, non-woven materials, pre-impregnations, support plates, fibrous composites and back-pulls. Furthermore, the employment as a support material can be provided for other resins or resin-like substances. For example, this is the case in the employment of tar papers, bitumen etc.

Therein, in further configuration of the invention, it has proven advantageous if the at least one core card for producing the laminate is impregnated with a resin or a similar substance and/or is pre-impregnated with a resin or a similar substance and/or dried and/or cut and/or pressed with at least one pre-impregnation. Hereby, the core card can be optimally adapted to its respective purpose of employment and the specific production of the laminate. With a pre-impregnation, the core paper or the core card is only partially impregnated.

Further advantages arise in that the resin is selected from a group including phenol resins, phenol formaldehyde resins, melamine resins and melamine formaldehyde resins and/or that the core card is impregnated with 30% by wt. to 100% by wt. of resin. Hereby, the desired characteristics of the laminate as well as the capability of impregnating or resin absorbing capacity of the core card or the core cards can be optimally taken into account. Basically, high capability of impregnating the core card is usually desired. For example, the core card can be impregnated with 30% by wt., 31% by wt., 32% by wt., 33% by wt., 34% by wt., 35% by wt., 36% by wt., 37% by wt., 38% by wt., 39% by wt., 40% by wt., 41% by wt., 42% by wt., 43% by wt., 44% by wt., 45% by wt., 46% by wt., 47% by wt., 48% by wt., 49% by wt., 50% by wt., 51% by wt., 52% by wt., 53% by wt., 54% by wt., 55% by wt., 56% by wt., 57% by wt., 58% by wt., 59% by wt., 60% by wt., 61% by wt., 62% by wt., 63% by wt., 64% by wt., 65% by wt., 66% by wt., 67% by wt., 68% by wt., 69% by wt., 70% by wt., 71% by wt., 72% by wt., 73% by wt., 74% by wt., 75% by wt., 76% by wt., 77% by wt., 78% by wt., 79% by wt., 80% by wt., 81% by wt., 82% by wt., 83% by wt., 84% by wt., 85% by wt., 86% by wt., 87% by wt., 88% by wt., 89% by wt., 90% by wt., 91% by wt., 92% by wt., 93% by wt., 94% by wt., 95% by wt., 96% by wt., 97% by wt., 98% by wt., 99% by wt. or 100% by wt. of resin or a resin mixture. For most of the applications, contents between 30% by wt. and 60% by wt. are preferred. If the laminate is to be formed as an HPL laminate (high pressure laminate), a resin absorption of up to 56% or more is recommended. Usually, in CPL laminates (continuous pressure laminate), a lower capability of impregnating (e.g. resin absorption up to 36%) is desired. The relatively free adjustability of the porosity in one or more plies of the core card produced according to the invention therein opens new possibilities in the mode of operation of an impregnating plant with respect to throughput or quality.

Therein, it has proven advantageous if at least two core cards are disposed on top of each other, in particular stacked, for producing the laminate. Hereby, the mechanical characteristics of the laminate can also be optimally adapted to the desired purpose of employment besides the thickness. For example, up to 50, 200, 250 or more core cards can be stacked on top of each other to produce a particularly robust laminate. Therein, identically or differently formed core cards can basically be used. As already mentioned, therein, each core card in turn can have a single-layer or multi-layer laminar system or be composed of one or more layers.

In a further advantageous configuration of the invention, it is provided that at least one core card is lined, wherein in particular at least one foil of a plastic and/or at least one decorative paper preferably printed with a pattern and/or at least one release paper is disposed on the core card. Hereby, in particular various surface characteristics of the laminate can be specifically influenced. In particular, hereby, parameters such as impact, abrasion, scrub and scratch resistance, light resistance, resistance against chemicals, heat resistance, fire resistance, food safety, moisture resistance and optical impression can be specifically adjusted.

In a further advantageous configuration of the invention, it is provided that the at least one core card impregnated and/or pre-impregnated with the resin is heated at least above the melting point of the resin, pressed, cooled at least below the melting point of the resin and optionally further processed for producing the laminate. By the steps of heating, pressing and cooling, a solid connection of the individual core card plies to each other is ensured. The laminate resulting therefrom can then be further processed, for example pasted, deformed, cut, punched, drilled etc. on demand.

A second aspect of the invention relates to a core card for producing a laminated laminate, wherein the core card has a laminar system with at least one layer and wherein the laminar system is at least proportionally composed of reprocessed fibrous mixture. Therein, according to the invention, it is provided that the laminar system has an ash fraction of at most 15% by wt. Furthermore, it is provided according to the invention that the at least one layer of the laminar system includes at least a fraction of a reprocessed fibrous mixture, which was selected from a group before processing, which has:
   a Brecht-Holl fine fraction of at most 50% by weight;
   a Brecht-Holl long fiber fraction of at least 10% by weight;
   a Brecht-Holl short fiber fraction of at most 60% by weight; and
   an ISO 1762 ash fraction of at most 20% by weight;
and that the at least one layer of the laminar system includes at least a fraction of an additive selected from a group consisting of retention agents and wet strength agents. The core card according to the invention, which can also be referred to as core paper or core paperboard depending on its grammage, in other words, is at least proportionally composed of a specifically selected, reprocessed fibrous mixture and has a low ash fraction of at most 15% by wt. in the laminar system. Hereby, it is ensured in particularly simple and reliable manner that the core card has a good capability of impregnating, can be at least predominantly produced from reprocessed fibrous mixture and has a low abrasiveness with respect to further processing tools. By the possibility of producing the core card with respect to its fibrous content with a high fraction or even completely of the reprocessed fibrous mixture, the core card according to the invention additionally has a good air permeability as well as improved cost and environmental balance. Basically, it can be provided that the core card contains further additives besides a retention agent and/or a wet strength agent to achieve certain characteristics. However, due to the specific selection and processing of the reprocessed fibrous mixture, the use of further additives and in particular the use of surface active compounds can principally be omitted, whereby further cost and environmental advantages are achievable. Further resulting features and the advantages thereof can be taken from the descriptions of the first inventive aspect. Therein, advantageous configurations of the first inventive aspect are to be regarded as advantageous configurations of the second inventive aspect and vice versa.

The core card according to the invention can be obtained by a method according to any one of the embodiments of the first inventive aspect in particularly simple, flexible, environmentally friendly and inexpensive manner. The features arising herefrom and the advantages thereof can be taken from the descriptions of the first inventive aspect.

The above mentioned characteristics can be complied with in particularly simple and inexpensive manner if waste paper, in particular kraft containing waste paper sorts of the main group 4 and/or OCC waste paper, are used as the reprocessed fibrous mixture.

Therein, in further configuration, it has proven advantageous if the laminar system has an ash fraction of at most 8% by wt. and preferably of at most 4% by wt. and/or a fraction of fresh fibers of at most 20% by wt. and/or a fraction of waste paper of at least 80%, in particular of at least 95%. In particular ash fractions of 8.0% by wt., 7.5% by wt., 7.0% by wt., 6.5% by wt., 6.0% by wt., 5.5% by wt., 5.0% by wt., 4.5% by wt., 4.0% by wt., 3.5% by wt., 3.0% by wt., 2.5% by wt., 2.0% by wt., 1.5% by wt., 1.0% by wt., 0.5% by wt. or 0% by wt. as well as corresponding intermediate values such as for example 5.0% by wt., 4.9% by wt., 4.8% by wt., 4.7% by wt., 4.6% by wt., 4.5% by wt., 4.4% by wt., 4.3% by wt., 4.2% by wt., 4.1% by wt. or 4.0% by wt. etc. are to be understood by an ash fraction of at most 8% by wt. Hereby, the core card has a particularly low abrasiveness with respect to separating tools and additionally satisfies particularly high quality demands with respect to air permeability and capability of impregnating.

By a fraction of fresh fibers, the core card can basically have higher air permeability values. Hereto, the core card can have fresh fibers in a weight fraction of 1.0% by wt., 1.5% by wt., 2.0% by wt., 2.5% by wt., 3.0% by wt., 3.5% by wt., 4.0% by wt., 4.5% by wt., 5.0% by wt., 5.5% by wt., 6.0% by wt., 6.5% by wt., 7.0% by wt., 7.5% by wt., 8.0% by wt., 8.5% by wt., 9.0% by wt., 9.5% by wt., 10.0% by wt., 10.5% by wt., 11.0% by wt., 11.5% by wt., 12.0% by wt., 12.5% by wt., 13.0% by wt., 13.5% by wt., 14.0% by wt., 14.5% by wt., 15.0% by wt., 15.5% by wt., 16.0% by wt., 16.5% by wt., 17.0% by wt., 17.5% by wt., 18.0% by wt., 18.5% by wt., 19.0% by wt., 19.5% by wt. or 20.0% by wt. and corresponding intermediate values. Conversely, it can be provided that the laminar system is at least 80% by wt. composed of reprocessed fibrous mixture. By a fraction of at least 80%, in particular fractions of 80%, 81%, 82%, 83%, 84%, 85%, 86%, 87%, 88%, 89%, 90%, 91%, 92%, 93%, 94%, 95%, 96%, 97%, 98%, 99% or 100% as well as corresponding intermediate values such as for example 95.0%, 95.1%, 95.2%, 95.3%, 95.4%, 95.5%, 95.6%, 95.7%, 95.8%, 95.9% or 96.0% are to be understood. In other words, it is provided that the fibrous fraction of the core card is at least 80% or even completely composed of reprocessed fibrous material, for example of waste paper. Hereby, a particularly good environmental balance as well as considerable cost savings is achieved by omission of fresh fibers.

Therein, it has proven particularly advantageous if the laminar system of the core card or the entire core card is formed free of surface active substances. Hereby, in particular disadvantages with regard to the load of the water circulation system on the paper or card machine, destabilization of the chemical equilibrium of the machine cycle, increase of the production cost per ton of finished product and increased environmental and waste water load are avoided in the production of the core card.

Further advantages arise if the laminar system has at least two, preferably three and in particular four layers. Hereby, an optimum between mechanical strength and processability of the core card in particular with regard to air permeability and capability of impregnating is achieved.

In a further advantageous configuration of the invention, it is provided that at least an outer layer of the laminar system is formed more porous than an underlying layer of the laminar system. In this manner, the resin used in impregnating can particularly fast penetrate the entire laminar system of the core card and completely wet the core card. Alternatively, it can be provided that at least one inner layer of the laminar system is formed more porous than a layer of the laminar system located farther outside and/or that all of the layers of the laminar system have an at least substantially identical porosity. The porosity is a non-dimensional measurement parameter and presents the ratio of cavity volume to overall volume of the core card. Therein, deviations of ±10% are to be understood by an at least substantially identical porosity.

Therein, in further configuration of the invention, it has proven advantageous if each layer of the laminar system has an ash fraction of at most 15% by wt. and/or a fraction of fresh fibers of at least 20% by wt. In that each layer of the laminar system has an ash fraction of at most 15% by wt., a particularly low abrasiveness of the core card and correspondingly high cost advantages with regard to low idle times and low maintenance requirements of the separating machines used for cutting are achieved. A fresh fiber fraction of at most 20% by wt. allows the use of a correspondingly high waste paper fraction of at least 80%, whereby high cost advantages are also realized besides the corresponding environmental advantages.

A third aspect of the invention relates to the use of a core card obtainable and/or obtained by means of a method according to any one of the embodiments of the first inventive aspect and/or a core card according to any one of the embodiments of the second inventive aspect for producing a laminated and/or non-laminated laminate. The features arising herefrom and the advantages thereof can be taken from the descriptions of the first and the second inventive aspect. Therein, advantageous configurations of the first and the second inventive aspect are to be regarded as advantageous configurations of the third inventive aspect and vice versa.

In an advantageous configuration of the invention, it is provided that multiple plies of the core card are used to produce a laminated laminate. Hereby, the thickness as well as the mechanical characteristics of the laminate can be optimally adjusted.

Further advantages arise if a laminate of the group of the HPL laminates, CPL laminates, compact plates, overlays, decorative papers, decorative cards, decorative paperboards, foils, non-woven materials, pre-impregnations, support plates, fibrous composites, back-pulls and support materials is produced. In this manner, a laminate can be produced, which can be flexibly employed for example for kitchen, office, living furniture, bathroom, interior construction, wall lining, shop and exhibition construction, facades, vehicle construction and further in the area of sealing material such as for example tar paperboards, bitumen and the like.

A fourth aspect of the invention relates to a laminate, which includes at least one core card obtainable and/or obtained by means of a method according to an embodiment of the first inventive aspect and/or at least one core card according to an embodiment of the second inventive aspect. The features arising herefrom and the advantages thereof can be taken from the descriptions of the preceding inventive aspects. Therein, advantageous configurations of the first, second and third inventive aspects are to be regarded as advantageous configurations of the fourth inventive aspect and vice versa.

Therein, it has proven advantageous if the laminate, which can also be referred to as laminated material or decorative laminate, is formed as an HPL laminate, CPL laminate, compact plate, overlay, decorative paper, decorative card, decorative paperboard, foil, non-woven material, pre-impregnation, support plate, fibrous composite, back-pull and/or support material, in particular for resins and/or resin-like substances. In this manner, the laminate can be particularly flexibly configured and for example be employed for penetration composites, kitchen, office and living furniture, bathrooms, interior construction, wall linings, floor covers, shop and exhibition construction, facades, vehicle construction, linings, support plates of wood materials such as for example plywood or massive wood plates, chipboards, oriented standboard plates and fiber plates of high or medium density, for mineral-bound wood materials based on plastic, for producing fibrous composites such as for example natural fiber reinforced plastics, wood plastic composites and fiber ceramic composites and/or as a back-pull, in particular as a regenerate paper for coating backsides of laminates or surface-coated plates. Further basically possible fields of application and types of use of the laminate exemplarily include facades and rear-ventilated facade systems such as for example balconies, handrail claddings, railings, bounds, visual cover and windbreak, canopies, business portals and cabin construction, indoor applications such as for example walls, partitions, ceilings, doors, floor covers, stairs, furniture, chairs, tables, rails, window sills, worktops, counters, wash stands and wet room elements as well as outdoor applications such as for example balconies, facades, partial facades, reveals, outdoor furniture or signs. However, basically, the core card produced according to the invention can also be used for producing further laminates, for example for overlays, decorative papers, decorative cards, decorative paperboards, foils, non-woven materials, pre-impregnations, support plates, fibrous composites, back-pulls and support materials. The employment as a support material can be provided for other resins or resin-like substances. For example, this is the case in the employment for producing tar papers, bitumen etc.

In a further advantageous configuration of the invention, it is provided that the laminate includes at least 2 plies of the core card. For example, the laminate can include 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 200, 250 or more plies of the core card, wherein identical or different core cards can be used for all of the plies. Hereby, in particular, the thickness as well as the mechanical characteristics of the laminate can be optimally adapted to its purpose of employment. In addition to the core card plies, the laminate can include further plies, for example decorative and/or overlay foils, metal foils or fibers (e.g. aluminum foils), fibrous materials, fibrous fabrics, plastic foils or fibers (e.g. aramid foils or fibers), ceramic materials and the like.

A fifth aspect of the invention relates to an apparatus for performing a method according to an embodiment of the first inventive aspect and/or for producing a core card according to an embodiment of the second inventive aspect, wherein the apparatus includes at least one device for producing a fibrous suspension, which is at least proportionally composed of a reprocessed fibrous mixture. Furthermore, the apparatus includes at least one processing device, by means of which at least one de-ashing of the fibrous suspension can be performed until an ash fraction of the dry component of the fibrous suspension is at most 15% by wt., at least one metering device, by means of which at least one additive of a group consisting of retention agents and wet strength agents can be metered to the fibrous suspension, and at least one card machine, by means of which at least the laminate of the core card from the at least one fibrous suspension can be produced. The apparatus according to the invention thus at least allows performing the method according to the invention or the production of the core card according to the invention, whereby the features presented in connection with the preceding inventive aspects and the advantages thereof can be achieved. Advantageous configurations of the preceding inventive aspects are therefore to be regarded as advantageous configurations of the fifth inventive aspect and vice versa.

BRIEF DESCRIPTION OF THE DRAWINGS

Further features of the invention are apparent from the claims, the embodiments as well as based on the drawings. The features and feature combinations mentioned above in the description as well as the features and feature combinations mentioned below in the embodiments are usable not only in the respectively specified combination, but also in other combinations without departing from the scope of the invention. There shows:

DESCRIPTION OF THE INVENTION

Figure 1:
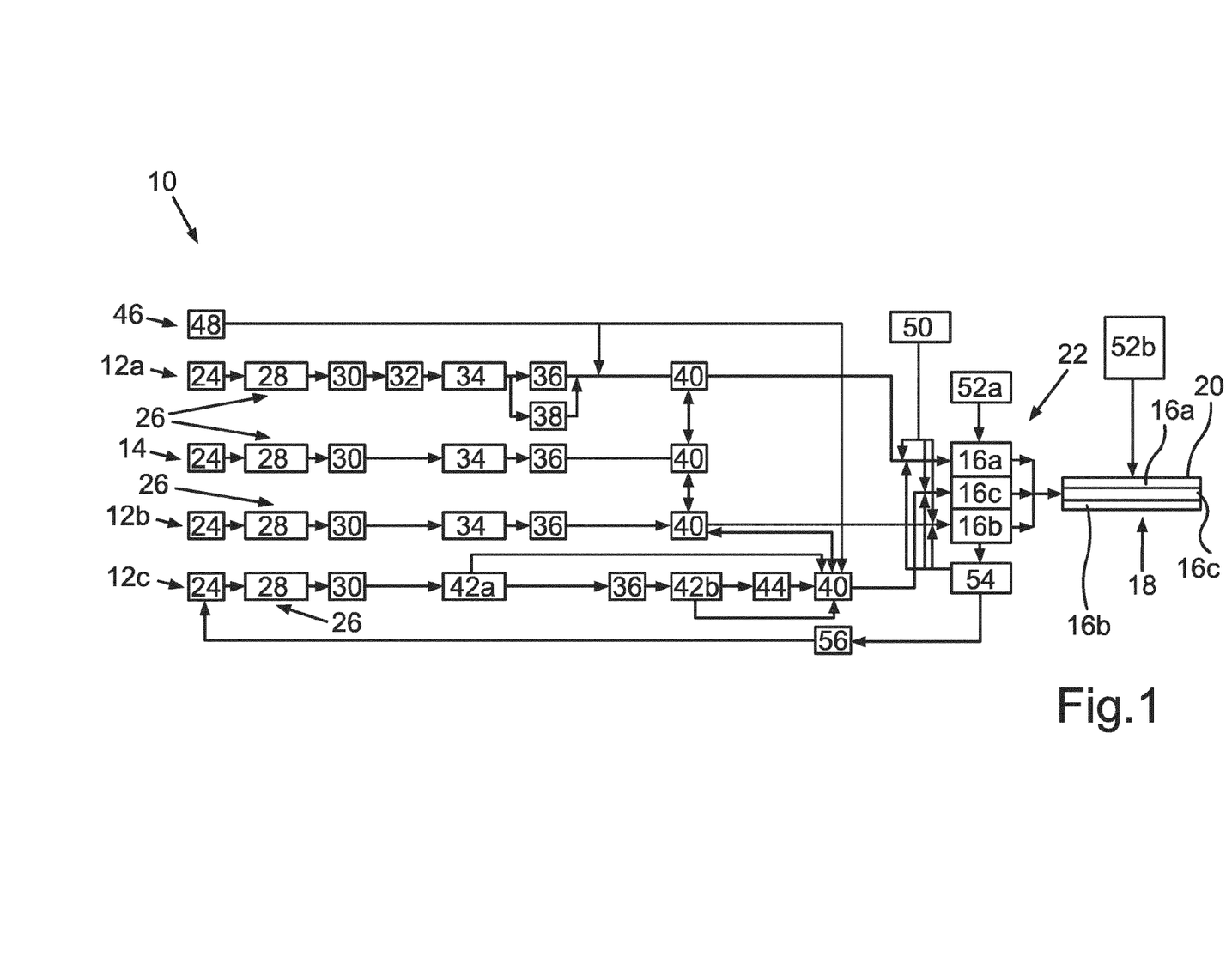
FIG. 1 a schematic diagram of an apparatus according to the invention for producing a core card.

FIG. 1 shows a schematic diagram of an apparatus 10 according to the invention for producing a core card 20 (see FIG. 3), which can also be referred to as "core board". Therein, a core card 20 in terms of the present invention can for example have a grammage between about 20 g/m$^2$ and about 800 g/m$^2$ and thereby can basically also be referred to as core paper or core paperboard according to convention. The apparatus 10 includes three production lines 12a-c as well as a reserve line 14 in the present embodiment. The production lines 12a-c serve for producing and processing a corresponding number of fibrous suspensions and serve for producing three layers 16a-c of a laminar system 18 of a core card 20 on a card machine 22. In the shown embodiment, the production line 12a functions as a line for producing a cover layer 16a, the production line 12b as a line for producing a layer 16b serving as a backside and the production line 12c as a line for producing an inlay or core or main layer 16c of the finished core card 20. The reserve line 14 serves as a supplemental line one the one hand if one of the production lines 12a-c is canceled for example due to maintenance works and moreover can be used for producing a further layer 16 (not shown) of the laminar system 18 or for coating outer layers 16a, 16b with more air-permeable fibrous material for increasing the air permeability of the core card 20 upon demand. The production lines 12a-c and the reserve line 14 each include a device 24 for producing an aqueous fibrous suspension of reprocessed fibrous mixture, for example of kraft containing waste paper. The device 24 can for example be a pulper. Therein, the used fibrous mixture is selected from a group having at least the following characteristics:

the Brecht-Holl fine fraction is at most 50% by weight;
the Brecht-Holl long fiber fraction is at least 10% by weight;

the Brecht-Holl short fiber fraction is at most 60% by weight; and
the ash fraction after ashing is at most 20% by weight.

The influence of the raw material composition on the air permeability of the finished core card 20 is important in the raw material selection. Therein, the requested characteristics can be particularly simply complied with, if kraft containing waste paper sorts of the main group 4 and/or so-called "(American) old corrugated containers" ((A)OCC) are used as the raw materials. The composition of the raw materials can for example be determined with the aid of a laboratory fractionation (Brecht-Holl fractionator) to define the percentage distribution of the individual fractions of long fiber, short fiber, fine materials and optionally coarse dirt and chips, respectively (e.g. Brecht-Holl: No.: 16 . . . 50 mesh/cm, according to DIN). The exact test instruction can for example be taken from Zellcheming leaflet VI/1/66. The ash determination of both the raw materials and the finished core card 20 can be effected according to ISO 1762. For determining the ash concentration according to ISO 1762, a suspension of the raw material to be measured and water is produced. After determining the material concentration (in % by wt.), the fibrous material is weighed, placed in a crucible and then heated at 575° C. in a muffle furnace. After 2 hours, one determines the output weight for assessing the ash content as a percentage to the initial weight. For determining the ash concentration in the finished core card 20, the card sample is first dried at 100° C. in the furnace, then weighed in and subsequently heated at 575° C. in a crucible in the muffle furnace. The ash determination is effected as a percentage to the initial weight of the raw material.

In order to adjust the ash fraction of the dry component of the individual fibrous suspension to a value of at most 15% by wt. and preferably to values below 4% by wt., the production lines 12a-c and the reserve line 14 include corresponding processing devices 26, by means of which the individual fibrous suspensions are cleaned and de-ashed. Therein, the individual processing devices 26 of the production lines 12a-c and the reserve line 14 can be identically or differently formed to be able to produce a laminar system 18 with identical or different layers 16. In the shown embodiment, each processing device 26 includes a coarse dirt sorting device, which is for example composed of centrifugally operating sorters 28, for example pressure sorters. The sorters 28 include a sorting basket as a stationary element and a rotor, for example a blade rotor, which generates positive pressure and negative pressure and thus keeps the basket surface free and discharges foreign substances such as plastic, glass and metal as a reject from the fibrous suspension. Therein, a certain de-ashing and fine material cleaning of the fibrous suspension are also already effected. Subsequently, the coarsely cleaned fibrous suspensions are passed into cleaner systems 30 of the processing device 26. The cleaner systems 30 separate heavier and abrasive particles like sand and glass, which have a higher specific weight than cellulose fiber. The same also applies to ash components. These particles are pressed against conical walls of the cleaner systems 30 together with the fibrous material with high water dilution (for example 2% material density) by means of centrifugal acceleration and discharged at the lower end of the cleaner systems 30 via the reject via the gravity. The cleaner systems 30 include 3 to 4 stages in the shown embodiment to achieve a maximum efficiency. The production line 12a additionally includes a deinking flotation device 32 in contrast to the other production lines 12b, 12c, by means of which ash and fine materials together with possible printing colors are here floated to the surface by agglomerations on air bubbles and discharged with the printing color sludge from the fibrous suspension. Therein, the flotation device 32 can be disposed upstream and/or downstream of the cleaner 30 viewed in flow direction.

Alternatively or additionally, it can be provided that at least one of the processing devices 26 allows metering of at least one acid and/or at least one base and/or introduction of $CO_2$. Within the scope of the present invention, a compound is understood by an acid, which causes decrease of the pH value of the aqueous system. Accordingly, a compound is understood by a base, which causes increase of the pH value of the aqueous system. For example, it can be provided that $CO_2$ or carbonic acid and/or caustic soda lye can be introduced into the aqueous system with the aid of at least one of the processing devices 26. Hereby, the pH value of the aqueous system can be adjusted to a desired value or even be buffered in a desired range among other things. Similarly, in this manner, the water hardness of the aqueous system can be influenced.

In particular, therein, the introduction or injection of $CO_2$ allows a particularly simple control of the ash and/or solid content of the fibrous suspension or the subsequent core card 20 since calcium and magnesium containing compounds can be primarily optionally brought in solution and/or precipitated as carbonates or hydrogen carbonates depending on the adjusted pH value.

In the production lines 12a, 12b and in the reserve line 14, the fibrous suspension subsequently enters a fine dirt sorting device 34, in which fine dirt sorting and dispersing (homogenizing) are effected. Herein, besides ash and fine materials, foreign substances as sand, Styrofoam, adhesives as well as small metal parts are also discharged from the fibrous system. Subsequently, concentration of the fibrous suspensions is effected in the concentrators 36. In the production line 12a, at least a part of the fibrous suspensions can additionally be treated with the aid of a variosplit device 38. The fibrous suspension is injected between a rotating roller and a rotating screen in the variosplit device 38. Therein, the rotating screen presses the fibrous suspension against the rotating roller. Thereby, much water and thereby also ash and fine materials are discharged from the fibrous suspension.

Subsequently, the de-ashed fibrous suspensions of the production lines 12a, 12b and the reserve line 14 are transported in basically optional stock vats 40. Therein, it can be basically provided that the stock vats 40 are fluidly coupled to each other to allow material exchange. Alternatively, stock vats 40 fluidly separated from each other or a common stock vat 40 can be used.

Subsequently, the fibrous suspensions of the production lines 12a, 12b can be transported to the card machine 22 to produce the layers or plies 16a, 16b via corresponding screens on the screen portion of the card machine 22.

In the production line 12c, downstream of the cleaner 30, a double fractionation of the fibrous suspension is effected, that is separation of short and long fibers. The long fibers are very valuable for the present production method for the production of layers 16 with high porosity. With conventional sorting methods, the long fibers normally are recognized as a reject and sorted out. The particularity of the present method is in that the long fibers are recovered from the reject of a first fractionator 42a and are not discharged from the material system. The separated stream of the fibrous suspension rich in short fibers is further transported to the stock vat 40 and mixed to the fraction rich in long fibers in controlled manner. The separated fraction rich in long fibers is concentrated (concentrator 36) and subjected to long fiber sorting in a second, basically optional fractionator 42b. The newly separated stream of the fibrous suspension rich in short fibers is also further transported to the stock vat 40. The fraction particularly rich in long fibers is dispersed in a disperser 44. Therein, it can be provided that the fraction rich in long fibers is supplied with water vapor upstream of the disperser 44 to render the long fibers smooth and more resistant to break during dispersing. The smoothness and resistance to break of the long fiber in the dispersion very severely reduce the generation of short fibers and of fine materials, the influence of which on the air permeability and on the capability of impregnating is negative.

Thus, the long fiber fraction is extremely gently treated to avoid every damage and shortening of the long fiber. For this purpose, optimized dispersers 44 can also be employed. The dispersers 44 are characterized by the specific distance of the toothed rims to each other and the adjusted gap between the disperser sets. The larger the distance of the toothed rims and the teeth on the disperser set to each other and the larger the gap between the disperser disks, the more gently the material dispersion is effected. That is, homogenization of the fibrous mixture occurs with minimal shortening of the fiber length. The higher the fiber length of the fibrous material and the higher the long fiber fraction in the overall material, the higher the porosity of the produced layer 16. This positively affects the air permeability and thereby the capability of impregnating the core card 20. Further positive process parameters for obtaining the long fibers are a high dilution, optimum adaptation of the rotor speeds and the adaptation of the differential pressures between inlet and outlet of the fractionators 42.

For adjusting the porosity and air permeability, furthermore, a fresh fiber line 46 is provided, which includes a pulper 48 with fresh fibers. The fresh fibers optionally can be mixed with the fibrous suspensions of the production lines 12a-c in the shown embodiment, wherein the fresh fiber fraction related to the overall fiber fraction of the individual fibrous suspensions is basically maximally 20% by wt. Therein, the addition of fresh fibers is preferably effected after purification or de-ashing of the fibrous suspensions to avoid damage and shortening of the fresh fibers. The basic advantage of fresh fibers is in their ash-freeness and their comparatively high fraction of long fibers.

In front of a screen portion or in the constant part of the card machine 22, a metering device 50 is disposed, by means of which at least one additive from a group consisting of retention agents and wet strength agents, is metered to the individual fibrous suspensions. As the retention agent for controlling drainage in the sheet formation, in the present embodiment, 0.3% to 0.8% of polyethylenimine are added to the fibrous suspensions. The employment of a wet strength agent is in particular important for further processing the core card 20 since as the processing step after production of the core card 20, impregnating with resin or a similar substance is effected. Herein, the core card 20 is passed through an immersion trough or the like with liquid artificial resin based on phenol formaldehyde (or melamine formaldehyde or a mixture of both or a resin-like substance). For a non-disruptive impregnation and further processing of the core card 20, a sufficient wet tear strength is important. In the present embodiment, this wet tear strength is ensured by the addition of maximally 2% by wt. of a wet strength agent based on polyamidoamine epichlorhydrin. However, it can basically also be provided that the core card 20 is formed free of wet strength agents. The higher the air permeability of the core card 20, the higher the possible resin absorption. The higher the resin absorption, however, the higher are also the demands on a stable and wet tear resistant core card 20, respectively. It is to be emphasized that addition of surface active compounds as additive is not effected. Hereby, load of the water circulation system of the apparatus 10, destabilization of the chemical equilibrium of the machine cycle, increase of the production cost as well as unnecessary environmental and waste water loads are avoided. However, basically, it can be provided that in the production of the core card 20 or of the fibrous suspension(s), besides retention agents and/or wet strength agents, further additives are used to influence the production process and the characteristics and processability of the core card 20 in the desired manner and/or to impart certain characteristics to a laminate 58 produced from the core card 20. As further additives, therein, basically, biopolymers, for example hemicellulose, cellulose, lignin and/or polyoses, and/or polysaccharides, for example starch, starch polymers, alginates, chitins, hemicellulose, cellulose derivatives, cellulose esters, cellulose acetate, cellulose triacetate, cellulose nitrate, cellulose ether, ethyl cellulose, methyl cellulose, oxyethyl cellulose, oxypropyl cellulose and carboxymethyl cellulose can be used. Further basically usable additives include resins such as phenol formaldehyde resins, melamine formaldehyde resins, mixtures of phenol formaldehyde resins and melamine formaldehyde resins, neutral or anionic polymers, polyvinyl alcohol, polyacrylamide, anionic or cationic polyelectrolytes such as for example acrylic acid, carboxymethyl cellulose, anionic or cationic starch, polydiallyl ammonium chloride (polyDADMAC) or polyvinylamine, natural dry strength agents such as for example galactomannan or alginates, synthetic dry strength agents such as for example polyamines, polyamides, polyalcohols, polyacrylamides, polyvinylalcohol, polyvinyl(alcohol acetate), polyimines or polyethylenimine (PEI), cross-linking or physical wet strength agents such as for example glyoxal, glutardialdeyde (1,5-pentanedialdehyde), aldehyde starch, polyamidoamine epichlorhydrin (PAAE), melamine formaldehyde (MF) or urea formaldehyde (HF), basic, acidic and/or substantive dyes (direct dyes), flame inhibitors such as for example halogenated flame inhibitors, organophosphor flame inhibitors or inorganic flame inhibitors such as aluminum hydroxide, magnesium hydroxide, ammonium sulfate, antimony trioxide or antimony pentoxide. Finally, additives from the groups of fixing agents, aluminum salts, flame retardants, defoamers, deaerators, lignin derivatives, lignin sulfonates, biocides and/or fungicides can also be used. Therein, the additives basically can be added once or multiple times at the same location and/or at different locations of the production process.

A first quality control 52a can be performed during sheet formation on the card machine 22. Hereto, the degree of grinding of the laminar system 18 (in degrees Schopper-Riegler, °SR) is for example determined.

In the present production method for the core card 20, due to the machine characteristics, multiple modes of operation are possible. Both a single-layer and multi-layer sheet formation is possible since the used card machine 22 is equipped with multiple Fourdrinier wires, a hybrid former and a top wire drainage on the main ply (not shown). Depending on the configuration of the card machine 22, a different number of layers can be produced at the same time. Each ply or layer 16 on the card machine 22 can be supplied with the same or with an individual material composition of kraft containing waste paper from the individual production lines 12a-c and the reserve line 14, respectively. In the present embodiment, the outer plies 16a, 16b are formed more porous than the inner ply or core layer 16c to allow particularly good capability of impregnating and resin absorbing capacity of the core card 20. However, in contrast, inner layers (core layer 16c) can basically be formed more porous than the layers located farther outside (outer layers 16a, 16b). Furthermore, all of the layers 16a-c can basically also have the same porosity, wherein the porosity can be adjusted higher or lower according to desire.

The process water arising in the production of the core card 20 in the card machine 22 is collected in a white water container 54 and cleaned and de-ashed by means of a micro flotation device 56 (pressure relief flotation). The separation is based on the agglomeration of fine materials and ash particles on air bubbles. The foam on the surface is then skimmed and discharged from the water circuit.

The cleaned process water is recycled and used for producing the fibrous suspensions.

The core card 20, which is exclusively composed of the three-layer laminar system 18 in the shown embodiment, can subsequently be dried and/or rolled by a tambour for storage or transport. Furthermore, a second quality control 52b can be performed by determining at least one parameter from the group of grammage, moisture content, density, dry breaking length, wet breaking length, air permeability, ash portion, capability of impregnating and porosity of the produced core card 20.

The capability of impregnating the core card 20 can be particularly simply determined by ultrasonic measurement. Therein, the measurement principle is based on the variation of the propagation of ultrasonic pulses while the core card 20 is introduced into a liquid medium and impregnates with the medium. For ultrasonic measurement, for example, a measurement apparatus can be used, which has a measuring cell with an ultrasonic transmitter and an ultrasonic receiver, wherein the measuring cell can be filled with a liquid. The liquid exerts a constant attenuation on the ultrasonic waves. If the liquid level in the measuring cell varies, thus, the ultrasonic intensity also varies. This intensity variation can for example be captured in millisecond intervals during the measurement and be represented in the form of a measurement curve. According to porosity or air permeability of the core card 20, the ultrasound experiences a differently high attenuation upon immersion of the core card sample into the measuring cell filled with liquid.

The described material processing with multiple production lines 12a-c and the above described processing steps in combination with the possibility of multi-layer sheet or layer formation on the card machine 22 allow specific, quality-oriented product design. Due to the low ash fraction of 8% or less, the core card 20 allows longer operating times and lower maintenance requirement for separating machines used for further processing. The high air permeability of the core card 20 has a direct influence on the resin impregnation or on the so-called penetration of the resin in the core card 20. The higher the resin absorption, the more homogenous the pre-impregnations can be pressed to laminates 58 (see FIG. 3).

Figure 2:
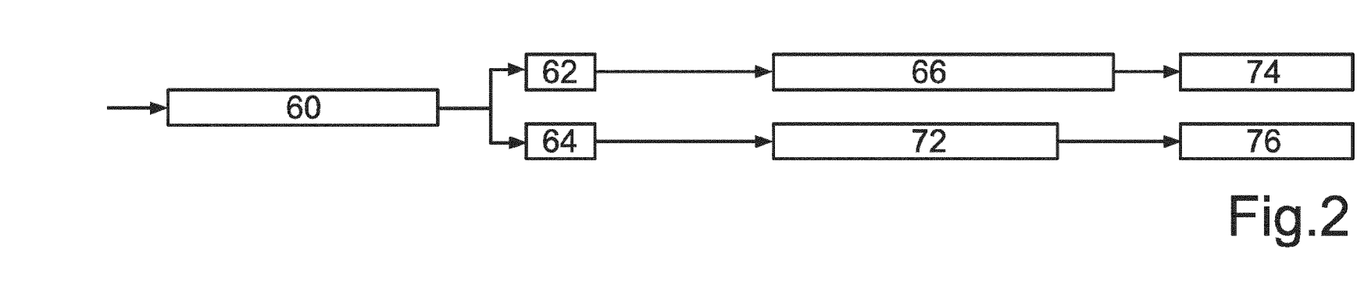
FIG. 2 a flow diagram of the further processing of the core card according to the invention to a laminated laminate.

FIG. 2 shows a flow diagram of the further processing of the core card 20 according to the invention to a laminated laminate 58. In the impregnating plant 60, the core card 20 is optionally unrolled, impregnated with a resin and/or a resin-like substance, dried and optionally cooled. As the resin, for example, a phenolic resin, a melamine resin or mixtures hereof can be used. Alternatively or additionally, however, other resins and/or synthetic resins can also be provided. In drying, polycondensation with cross-linking of the resin molecules with the cellulose of the core card 20 with cleavage of water molecules is effected.

Therein, capability of impregnating as high as possible of the core card 20 is basically desired. If the core card 20 is for example further processed to an HPL laminate 58 (high pressure laminate), resin absorption of up to 56% or more is desired. Thereto, the porosity of the fibrous suspensions for the outer layers 16a, 16b or for all of the layers 16a-c is increased in sheet formation on the card machine 22 (low degree of grinding, ca. 8-25°SR). This allows faster penetration of the artificial resin into the inner layer 16c as well as complete wetting of the core card 20 in the processing on the impregnating plant 60. If only a lower capability of impregnating (e.g. resin absorption up to 36% by wt.) is desired, as it is for example often the case with CPL laminates 58 (continuous pressure laminate), the outer layers 16a, 16b or all of the layers 16a-c are formed less porous to correspondingly control the resin wetting and penetration. The simple control of the porosity of the core card 20 thus allows completely new possibilities in the mode of operation of the impregnating plant 60 with respect to quality, throughput, configuration variants and the like.

Subsequently, the impregnated core card 20 (pre-impregnation) can be transported either to a CPL pressing machine 62, to an HPL pressing machine 64 or to another laminate production machine. Depending on the further processing, the core card 20 can be rolled, cut, stacked etc. hereto.

On the CPL pressing machine 62, in the method step 66, a continuous pressing operating with the steps of unrolling one or more rolls of core card 20 is effected. For example, the laminate 58 can be produced of up to 6 plies or more of the core card 20. Subsequently, resin liquefaction by heating, continuous pressing and cooling of the laminate 58 are effected. Optionally, the laminate 58 can be ground, cut and otherwise processed. The CPL laminate 58 can for example have a thickness of 0.6 mm to 1.2 mm. However, other thicknesses are also possible. Furthermore, the CPL laminate 58 can be provided with or without overlay foil 68 (see FIG. 3) from a plastic material for increasing the impact, abrasion, scrub and scratch resistance, light resistance, resistance against chemicals, heat resistance, fire resistance, food safety, moisture resistance, optical impression, color fastness etc. Similarly, the laminate 58 (impregnation) can be provided with a decorative paper 70, which in turn can be printed with a pattern, non-printed, uniformly colored or pre-impregnated. Similarly, the laminate 58 can be provided with pre-impregnated release papers, metal foils, plastic foils, fibrous materials, fabrics etc. (1, 2 or more plies).

On the HPL pressing machine 64, in the method step 72, a discontinuous pressing operating is effected. Here too, the laminate 58 can be produced with or without overlay foil 68 (increase of the scrub and scratch resistance, color fastness etc.). For example, the laminate 58 can be produced as an HPL laminate plate with a thickness between 6 mm and 8 mm. Hereto, for example 30 plies of the core card 20 can be used. For other thicknesses of the HPL plate, correspondingly more or less plies of the impregnated core card 20 are required. However, HPL plates basically can also be produced with nearly arbitrarily many plies of the core card 20. For a so-called thin laminate, for example 2-3 plies of the core card 20 can be used. For thicker laminates, for example 30-60 plies or 100-250 plies of the core card 20 can be used. The number of the plies also depends on the grammage or thickness of the core card 20 among other things. For example, the core card 20 according to the invention can have a grammage of 215+/−4 (grams per square meter, g/m$^2$). For reducing the number of plies, however, a core card 20 with a higher grammage, for example 250 gsm, or more can also be produced and used.

Furthermore, the HPL laminate 58 can be provided with or without overlay foil 68 (see FIG. 3) of plastic material for increasing the scrub and scratch resistance, color fastness etc. Similarly, the laminate 58 (impregnation) can be provided with a decorative paper 70, which in turn can be printed with a pattern, non-printed, uniformly colored. Similarly, the laminate 58 can be provided with release papers (1, 2 or more plies).

Subsequently, the CPL or HPL laminate 58 can be further processed with corresponding processing devices 74 and 76, respectively. For example, by means of the processing devices 74, gluing of the backside, adhering to an MDF plate or a lining of surfaces, for example for kitchen facades etc. can be effected. By means of the processing devices 76, the HPL laminate 58 is for example punched, sawed, cut, drilled or connected to other components. The HPL laminate 58 can for example be used as a partition, room cladding, worktop or the like.

Figure 3:
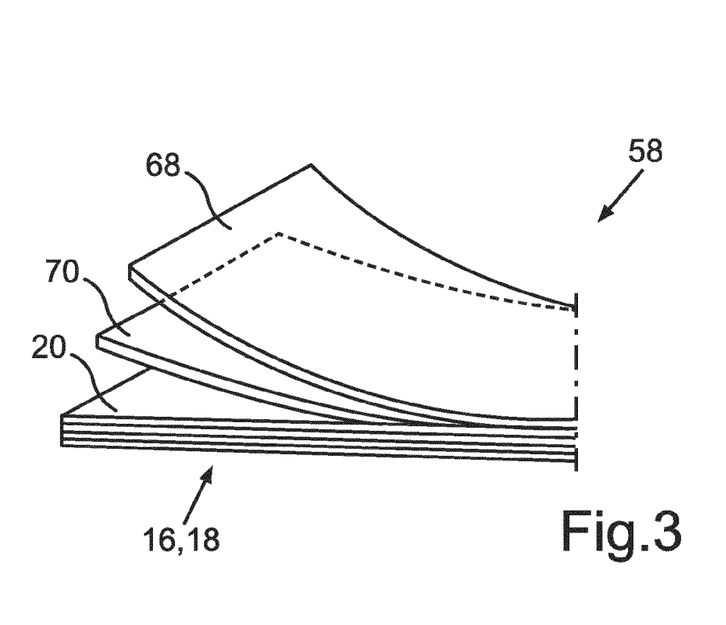
FIG. 3 a schematic perspective view of a laminate according to the invention, which is produced of a core card according to the invention.

FIG. 3 shows a schematic perspective view of an embodiment of the laminate 58 according to the invention, which is produced of a ply of the core card 20 according to the invention. Therein, the core card 20 in turn has a laminar system 18 with four layers 16. The laminate 58 further has a transparent overlay foil 68 as well as a decorative paper 70 and therefore can also be referred to as decorative laminar pressed material plate (DKS).

The parameter values specified in the documents for defining process and measurement conditions for the characterization of specific characteristics of the inventive subject matter are to be considered as encompassed by the scope of the invention even within the scope of deviations—for example due to measurement errors, system errors, weighing errors, DIN tolerances and the like.

The invention claimed is:

1. A method for producing a core card for a laminate, wherein the core card has a laminar system with at least one layer, comprising the steps of:
   a) providing a reprocessed fibrous mixture having at least the following characteristics:
      at most 50% by weight Brecht-Holl fine;
      at least 10% by weight Brecht-Holl long fiber;
      at most 60% by weight Brecht-Holl short fiber; and
      the ISO 1762 ash fraction is at most 20% by weight,
   b) producing at least one fibrous suspension, which contains at least a fraction of the fibrous mixture provided,
   c) processing the at least one fibrous suspension by carrying out at least one de-ashing of the fibrous suspension until an ash fraction of the dry component of the fibrous suspension is at most 15% by weight, and by adding at least one additive to the at least one fibrous suspension, the additive being selected from a group consisting of retention agents and wet strength agents; and
   d) producing the laminar system from the at least one fibrous suspension.

2. The method according to claim 1, wherein in step a) kraft containing waste paper sorts of the main group 4 and/or OCC waste paper, is used as the reprocessed fibrous mixture.

3. The method according to claim 1, wherein a laminar system is produced, which has an ash fraction of at most 4% by wt. and/or which has a fraction of at least 95% of the provided waste paper.

4. The method according to claim 1, wherein fresh fibers, in particular cellulose, are mixed with at least one fibrous suspension before producing the laminar system, wherein the fraction of the fresh fibers on the overall fibers of the fibrous suspension is at most 20% by wt.

5. The method according to claim 1, wherein a multi-stage cleaner system and/or a disperser and/or a flotation device and/or a variosplit device are used for processing the fibrous suspension.

6. The method according to claim 1, wherein at least one fibrous suspension is concentrated before producing the laminar system.

7. The method according to claim 1, wherein at least a part of at least one fibrous suspension is fractioned into a long fiber fraction and a short fiber fraction before producing the laminar system.

8. The method according to claim 7, wherein the long fiber fraction and/or the short fiber fraction are supplied with water vapor and/or homogenized and/or dispersed.

9. The method according to claim 7, wherein the long fiber fraction and the short fiber fraction are mixed with the fibrous suspension in a predetermined ratio after fractionating.

10. The method according to claim 1, wherein the laminar system is produced with at least two and preferably with at least three layers.

11. The method according to claim 10, wherein at least one outer layer of the laminar system is formed more porous than an underlying inner layer of the laminar system and/or that at least one inner layer of the laminar system is produced more porous than a layer of the laminar system located farther outside and/or that all of the layers of the laminar system are produced with an at least substantially identical porosity.

12. The method according to claim 11, wherein at least one layer of the laminar system has a degree of grinding between 25°SR and 8°SR, and/or that at least one layer of the laminar system has a degree of grinding between 8°SR and 60°SR.

13. The method according to claim 1, wherein at least two differently produced and/or differently processed fibrous suspensions and/or at least two identically produced and/or identically processed fibrous suspensions are used for producing the laminar system.

14. The method according to claim 1, wherein the additive is added to the fibrous suspension related to the dry matter in a weight fraction of at most 5.0% and/or that the additive includes a retention agent, which is added to the suspension in a weight fraction between 0.2% and 0.9%, related to the dry matter, and/or that the additive includes a wet strength agent, which is added to the suspension in a weight fraction of between 0.5% and 2.0% related to the dry matter.

15. The method according to claim 1, wherein at least one retention agent from the group of polyacrylamides, polyethylenimines and polyamidimines and/or at least one wet strength agent from the group of polyamidoamine epichlorhydrin resins, epoxy resins, polyamine resins, isocyanate resins, melamine formaldehyde resins, urea formaldehyde resins, formaldehyde resins, dialdehyde starch, glyoxal, glutaraldehyde and/or a copolymer of at least two of the listed substances is used as the additive.

16. The method according to claim 1, wherein at least one acid and/or at least one base and/or $CO_2$ is additionally used as the additive.

17. The method according to claim 1, wherein process water of card machine arising in the production of the laminar system is de-ashed by means of a micro flotation device, and/or at least predominantly freed of fine materials and/or used for producing at least one fibrous suspension.

18. The method according to claim 1, wherein at least one parameter of the group of grammage, moisture content, density, dry breaking length, wet breaking length, air permeability, ash fraction, capability of impregnating and porosity of the produced core card is determined.

19. The method according to claim 18, wherein the capability of impregnating the core card is determined with the aid of ultrasonic measurement.

20. The method according claim 1, wherein at least one core card is used for producing an HPL laminate and/or a CPL laminate and/or a compact plate and/or as a support material for resins or resin-like substances.

21. The method according to claim 20, wherein the at least one core card for producing the laminate is impregnated with a resin and/or a resin-like substance and/or is pre-impregnated with a resin and/or a resin-like substance and/or dried and/or cut and/or pressed with at least one pre-impregnation.

22. The method according to claim 21, wherein the resin is selected from a group including phenol resins, phenol formaldehyde resins, melamine resins and melamine formaldehyde resins, and/or that the core card is impregnated with 30% by wt. to 100% by wt. of resin.

23. The method according to claim 20, wherein at least two core cards are disposed one on top of the other, in particular stacked for producing the laminate.

24. The method according to claim 20, wherein at least one core card is lined, wherein at least one foil of a plastic and/or at least one decorative paper printed with a pattern and/or at least one release paper is disposed on the core card.

25. The method according to claim 20, wherein the at least one core card impregnated and/or pre-impregnated with the resin is heated at least above the melting point of the resin, pressed, cooled at least below the melting point of the resin and optionally further processed for producing the laminate.

26. The method according to claim 1, wherein laminate is formed as an HPL laminate, CPL laminate, compact plate, overlay, decorative paper, decorative card, decorative paperboard, foil, non-woven material, pre-impregnation, support plate, fibrous composite, back-pull and/or support material in particular for resins and/or resin-like substances.

27. The method of claim 26, wherein the laminate includes at least 2 plies of the core card.

* * * * *